May 12, 1953   G. K. JENSEN ET AL   2,638,543
SQUELCH CIRCUIT
Filed July 14, 1945
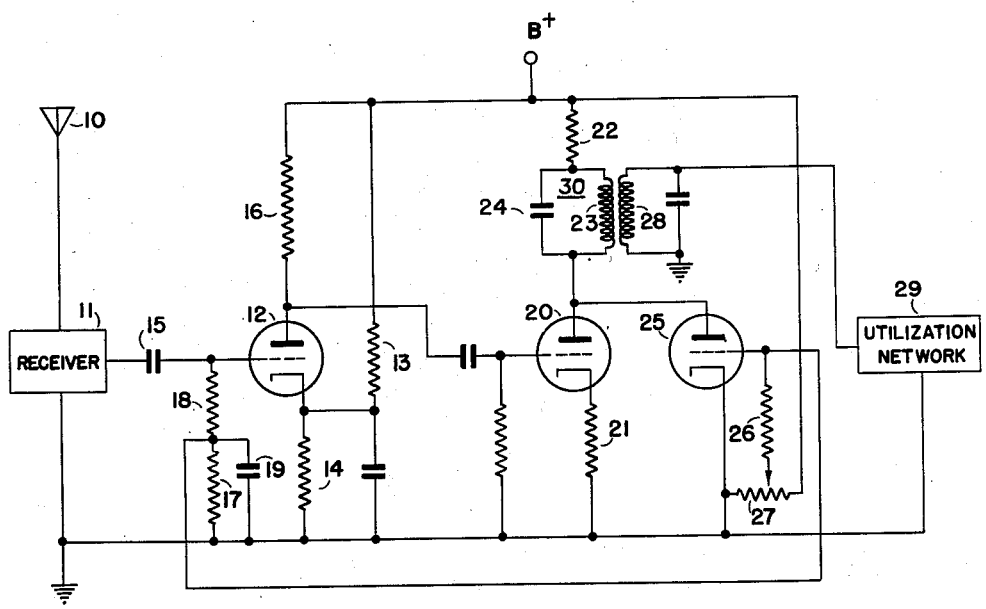
Inventors
GAROLD K. JENSEN
JACOB BENVENISTE

UNITED STATES PATENT OFFICE 2,638,543

SQUELCH CIRCUIT

Garold K. Jensen and Jacob Benveniste,
United States Navy

Application July 14, 1945, Serial No. 605,167

6 Claims. (Cl. 250—27)

(Granted under Title 35, U. S. Code (1952),
sec. 266)

This invention relates to a means for effectively disabling a radio receiving system when the input signal voltage drops below a certain predetermined minimum value.

In this invention the point at which the disabling, or squelching, circuit comes into operation is selected on the basis of the minimum signal level at which the received signal is intelligible over the noise produced either in the receiver or by interfering signal sources. In particular, the present system is useful in eliminating noise which would otherwise be objectionable when tuning from one station to another or in "break-in" operation.

An object of this invention is therefore to provide a circuit for disabling a receiving system when the maximum peak of the received signal falls to a predetermined minimum level.

A further object of this invention is to provide in a radio pulse receiver of the type which employs a resonant circuit for transforming periodic pulse signals into a sine wave, a circuit which will damp the oscillations occurring in the resonant circuit when the received pulse signals drop below a predetermined value.

Other objects and features of the present invention will become apparent upon a careful consideration of the following detailed description when taken together with the accompanying drawings, the single figure of which is illustrative of one embodiment of the invention.

With reference to the drawing, a pulse type receiver system employing a squelching circuit constructed according to the principles of the present invention is disclosed. For purposes of illustration the squelching circuit is shown as operating in conjunction with the receiving equipment of a pulse frequency modulation system such as that disclosed in our copending application entitled, "Communication System," Serial No. 605,168 filed July 14, 1945, now Patent No. 2,580,431.

Radio frequency signals emitted by a distant transmitter are received by the antenna 10 and are amplified and detected by a suitable number of preamplifier stages indicated in general at 11. Included in the circuit 11, but not shown, may be a noise gating circuit which functions to permit an output from circuit 11 only during the arrival of a desired pulse signal. Such a means is disclosed in the aforementioned patent application. There may also be included in the design of the circuit 11 a suitable limiter stage which is arranged so that all signals impinging upon the antenna 10 and exceeding a certain predetermined level appear at the output of 11 with uniform positive amplitude. Tube 12, to which the output of the circuit 11 is applied, is biased near cutoff by means of its cathode connection to the juncture point of resistances 13 and 14 which are in turn connected between B+ and ground. Output pulses from tube 12 appear across its plate load resistance 16, an unipolar negative voltage pulses. The peak pulse signals which cause the grid to overcome the cathode bias voltage on tube 12 will cause rectified grid current to flow with the result that the coupling capacitance 15 is charged negatively. Between pulse signals the capacitance 15 discharges slightly through resistances 17 and 18 connecting the grid to ground to produce at the juncture point of these resistances a negative voltage having a magnitude primarily dependent upon the strength of the signal impinging on antenna 10. As will be hereinafter described, the voltage existing at the juncture point of resistances 17 and 18 is used for the purpose of controlling the operation of the squelching circuit. To provide a smooth and reliable control voltage which has a magnitude governed by the peak received signal strength when the signals are below the limiting level established by the aforementioned limiter stage of circuit 11, a capacitance 19 is connected between the junction point of resistance 17 and 18 and ground. The size of the condenser 19 is chosen such that the time constant that it forms with resistance 17 is several times greater than the recurrence period of the applied pulses.

In the case where the receiving system is adapted to operate on pulse frequency modulation the received pulse signals may be converted into a frequency modulated sine wave. For this purpose a tuned circuit comprising inductance 23 and capacitance 24 and adapted to be shocked into oscillations by the output of tube 12 may be, for example, inserted in the plate circuit of a second amplifier tube 20. This amplifier is biased normally conducting by means of its unbypassed cathode resistance 21. The tuned circuit itself is selected to resonate at the average, or unmodulated, pulse recurrence rate of the received signal and functions to produce a frequency modulated sine wave in response to the received pulse signal. The sine wave output from the tuned primary circuit is taken from an inductively coupled tuned secondary winding 28 and applied to a suitable utilization network indicated in general at 29. This network may comprise, for example, a limiter stage, a frequency discriminator, an audio amplifier, and an audio reproducing device all of conventional design, connected together in the order given.

In controlling a squelching circuit from a source of voltage generated at the receiver in response to the received pulse signals, such as that produced at the juncture of resistances 17 and 18 it is apparent that the squelching circuit itself should be situated at a stage subsequent to the point where the control voltage is developed. In the present case it has been found advantageous to insert the squelching circuit at the pulse to sine wave conversion stage 20. For squelching purposes a suitable amplifier tube 25 functioning as a variable resistance element is connected in shunt with tube 20. The grid of tube 25 is returned directly to the juncture point of resistances 17 and 18 and also through resistance 26 to the movable tap on potentiometer 27. The resistance of this potentiometer is connected between B+ and ground. In normal operation the bias on tube 25 is adjusted by the movable tap on potentiometer 27 so that when the peak input signal being received is unintelligible over the noise the negative voltage developed at the juncture point of resistances 17 and 18 rises positively to a point, controllable by potentiometer 27 where tube 25 conducts. As conduction by tube 25 takes place a large current is caused to flow through both resistance 22, which is inserted in the plate of tube 20 and the inductance of the tuned circuit consisting of inductance 23 and capacitance 24. This current both lowers the voltage at the plate of tube 20 by reason of the voltage drop through resistance 22 and loads the tuned circuit so as to prevent the pulse signal from the output of tube 12 from exciting oscillations therein. As the peak signal level increases to its normal level, the voltage at the juncture point of resistances 17 and 18 increases negatively to cut off tube 25. This action effectively removes the highly dissipative unilateral current component drawn by tube 25 through inductance 23 thereby permitting rapid build-up of the oscillations in the tuned circuit 30. From the foregoing it is apparent that a number of modifications of the basic circuit may be made without exceeding the spirit of the invention. For example, in the case where other types of pulse modulation systems are employed the stage to which the squelching circuit is connected is immaterial as long as the squelching circuit operates to sufficiently reduce the stage gain to suppress the receiver output. Therefore this invention is not to be limited except as is necessitated by the prior art and the spirit of the appended claims.

The invention described herein may be manufactured and used by or for the Government of the United States of America for governmental purposes without the payment of any royalty thereon or therefor.

What is claimed is:

1. In a pulse energy operative device, a pulse energy source providing recurrent pulses of variable amplitude, a resonant circuit connected to the pulse energy source to produce sinusoidal oscillations in response to said pulses, an energy dissipative device connected to the resonant circuit, and a peak detection circuit coupling said pulse energy source to said energy dissipative device operative to produce heavy damping of the resonant circuit except when pulses from the energy source have at least a preselected minimum amplitude.

2. In a receiving device for converting frequency modulated input pulses whose amplitudes may vary into a frequency modulated sinusoidal waveform, a resonant circuit tuned to the average recurrence frequency of said pulses, input means applying the input pulses to said resonant circuit, damping means connected to said resonant circuit, a peak detector including a time constant circuit having a time constant greater than the recurrence period of the pulses, said peak detector being coupled between the input side of said input means and said damping means to render the damping means inoperative when the average amplitude of the input pulses maintains at least a selected minimum level.

3. In a receiving device for converting frequency input pulses whose amplitudes may vary into a frequency modulated sinusoidal waveform, a resonant circuit tuned to the average recurrence frequency of said pulses, electron tube driver means applying the input pulses to said resonant circuit, damping means connected to said resonant circuit, a peak detector including a time constant circuit having a time constant greater than the recurrence period of said pulses, said peak detector being coupled between the input side of said driver means and said damping means to render the damping means inoperative when the average amplitude of the input pulses maintains at least a selected minimum level.

4. In a receiving device for converting frequency modulated input pulses whose amplitudes may vary into a frequency modulated sinusoidal waveform, a resonant circuit tuned to the average recurrence frequency of said pulses, electron tube driver means applying the input pulses to said resonant circuit, an electron tube energy dissipating element connected to said resonant circuit, a peak detector including a time constant circuit having a time constant greater than the recurrence period of the pulses, said peak detector being coupled between the input side of said driver tube and electron tube energy dissipating element to render the electron tube dissipating element inoperative when the average amplitude of the input pulses maintains at least a selected minimum level.

5. In a receiving device for converting frequency modulated input pulses whose amplitudes may vary into a frequency modulated sinusoidal waveform, a resonant circuit tuned to the average recurrence frequency of said pulses, electron tube driver means applying the input pulses to said resonant circuit, an electron tube energy dissipating element connected to said resonant circuit, a peak detection circuit coupled between the input side of said driver tube and said energy dissipating tube operative to develop a biasing voltage to render said electron tube energy dissipating element non-conductive when the average amplitude of the input pulses maintains at least a selected minimum level.

6. In a receiving device for converting frequency modulated input pulses whose amplitudes may vary into a frequency modulated sinusoidal waveform, a resonant circuit tuned to the average recurrence frequency of said pulses, driver means applying the input pulses to said resonant circuit, an electron tube and a resistance serially connected with said resonant circuit, a peak detector including a time constant circuit having a time constant greater than the recurrence period of said pulses, said peak detector being coupled between the input side of said driver means and said electron tube to render said tube nonconducting when the average amplitude of the input pulses maintains at least a selected minimum level.

GAROLD K. JENSEN.
JACOB BENVENISTE.

References Cited in the file of this patent

UNITED STATES PATENTS

| Number | Name | Date |
|---|---|---|
| 2,152,482 | Johnson | Mar. 28, 1939 |
| 2,381,928 | Roberts | Aug. 14, 1945 |
| 2,416,308 | Grieg | Feb. 25, 1947 |
| 2,434,922 | Grieg | Jan. 27, 1948 |
| 2,440,278 | Labin et al. | Apr. 27, 1948 |
| 2,448,543 | Moore | Sept. 7, 1948 |
| 2,470,573 | Moore | May 17, 1949 |
| 2,527,474 | Alvarez | Oct. 24, 1950 |